(12) United States Patent
Sasaki et al.

(10) Patent No.: US 10,454,172 B2
(45) Date of Patent: Oct. 22, 2019

(54) LOOP ANTENNA

(71) Applicant: Nippon Telegraph and Telephone Corporation, Tokyo (JP)

(72) Inventors: Ai-ichiro Sasaki, Atsugi (JP); Tsutomu Mizota, Atsugi (JP); Hiroki Morimura, Atsugi (JP); Osamu Kagami, Atsugi (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 15/757,249

(22) PCT Filed: Aug. 26, 2016

(86) PCT No.: PCT/JP2016/074921
§ 371 (c)(1),
(2) Date: Mar. 2, 2018

(87) PCT Pub. No.: WO2017/126151
PCT Pub. Date: Jul. 27, 2017

(65) Prior Publication Data
US 2018/0342806 A1 Nov. 29, 2018

(30) Foreign Application Priority Data

Jan. 22, 2016 (JP) ................. 2016-010346

(51) Int. Cl.
*H01Q 9/04* (2006.01)
*H01Q 7/08* (2006.01)
(Continued)

(52) U.S. Cl.
CPC ................. *H01Q 9/04* (2013.01); *H01Q 7/08* (2013.01); *H01Q 23/00* (2013.01); *H04B 5/02* (2013.01)

(58) Field of Classification Search
CPC ............ H01Q 7/08; H01Q 9/04; H01Q 23/00
See application file for complete search history.

(56) References Cited

U.S. PATENT DOCUMENTS

| 4,805,232 A * | 2/1989 | Ma .................... H01Q 7/005 343/788 |
| 6,529,169 B2 * | 3/2003 | Justice ............. G08B 13/2477 343/745 |

(Continued)

FOREIGN PATENT DOCUMENTS

| CN | 1185865 A | 6/1998 |
| CN | 102057552 A | 5/2011 |

(Continued)

OTHER PUBLICATIONS

Office Action, Chinese Patent Application No. 201680051375.8, dated Aug. 10, 2018, 10 pages.

(Continued)

*Primary Examiner* — Hoang V Nguyen
(74) *Attorney, Agent, or Firm* — Kilpatrick Townsend & Stockton LLP

(57) ABSTRACT

A main loop is an open loop that is wound on a bar-shaped rod formed of a magnetic body or an insulation body and that has terminals T and T that couple a signal source or a receiving circuit to the main loop. The number of turns is 1 or more. An amplifying loop is wound on a part of the rod that is different from the part on which the main loop is wound. The main loop and the amplifying loop are thus spaced from each other. The amplifying loop is a closed loop including no terminals. The number of turns is 1 or more. The number of turns may be the same as or different from the number of turns of the main loop.

6 Claims, 2 Drawing Sheets

(51) Int. Cl.
*H04B 5/02* (2006.01)
*H01Q 23/00* (2006.01)

(56) References Cited

U.S. PATENT DOCUMENTS

| | | |
|---|---|---|
| 2005/0057422 A1 | 3/2005 | Deguchi et al. |
| 2009/0224608 A1 | 9/2009 | Cook et al. |
| 2011/0095617 A1 | 4/2011 | Cook et al. |
| 2015/0349423 A1 | 12/2015 | Tenno |

FOREIGN PATENT DOCUMENTS

| | | |
|---|---|---|
| JP | 42-022327 B1 | 11/1967 |
| JP | 2001-185939 A | 7/2001 |
| JP | 2005-102101 A | 4/2005 |
| JP | 2005-275871 A | 10/2005 |
| JP | 2008-259039 A | 10/2008 |
| JP | 2011-086009 A | 4/2011 |
| JP | 2013-125991 A | 6/2013 |
| JP | 2013-162709 A | 8/2013 |
| JP | 2014-117150 A | 6/2014 |
| JP | 2014-135538 A | 7/2014 |
| JP | 2014-135539 A | 7/2014 |
| JP | 5825457 B1 | 2/2015 |

OTHER PUBLICATIONS

Supplementary European Search Report, European Patent Application No. 16886391.8, dated Mar. 14, 2019.
International Search Report, PCT Application No. PCT/JP2016/074921, dated Sep. 20, 2016.
Office Action, Japanese Patent Application No. 2016-010346, dated Jun. 13, 2016.
Decision of Refusal, Japanese Patent Application No. 2016-010346, dated Sep. 9, 2016.
Decision to Grant, Japanese Divisional Patent Application No. 2016-238110, dated Oct. 13, 2017.

* cited by examiner

RELATIONSHIP BETWEEN CURRENT I2 AND CAPACITORS C1,C2 OF AMPLIFYING LOOP.

LOOP ANTENNA

This application is a national stage application of PCT/JP2016/074921, which claims priority to Japanese Application No. 2016-010346, both of which are incorporated herein by reference.

TECHNICAL FIELD

The present invention relates to a loop antenna that contributes to area expansion of a radio system using a magnetic field.

BACKGROUND ART

Recently, in a short field communication authentication technology such as near field communication (NFC), there is a service performed based on intention and behavior of a user while purposely limiting the authentication area. In a case of forming the authentication area with a magnetic field, a loop antenna (coil) is used, and spherical magnetic field distribution is formed on the antenna surface by allowing a current to flow through the antenna. In the radio system using the magnetic field, the distance attenuation property is more precipitous than that in a system using radio waves, and there is an advantage that a boundary of the radio area can be clearly distinguished; however, in order to widely expand the radio area, increase of an amount of the current supplied from a transmitter is required.

PRIOR ART DOCUMENT

Patent Document

Patent document 1: Japanese Patent Application Publication No. 2013-125991
Patent document 2: Japanese Patent Application Publication No. 2014-135538
Patent document 3: Japanese Patent Application Publication No. 2014-135539

SUMMARY OF THE INVENTION

Problem to be Solved by the Invention

The present invention has been made in view of the above problem, and an objective of the present invention is to provide a small power-consuming loop antenna that contributes to area expansion of the radio system using a magnetic field.

Means for Solving the Problem

In order to solve the above problem, a loop antenna of the present invention includes: a main loop that is an open loop coupled to a signal source or a receiving circuit; an amplifying loop that is a closed loop having a same shape as the main loop; a first capacitor that is coupled to the main loop; and a second capacitor that is coupled to the amplifying loop, in which the main loop and the amplifying loop are wound on a bar-shaped rod that is formed of a magnetic body or an insulation body.

Effect of the Invention

According to the loop antenna of the present invention, in a case of using the signal source, a current that is sufficiently greater than a current flowing through the main loop can be accumulated in the amplifying loop; as a result, it is possible to generate a great magnetic field.

In addition, according to the loop antenna of the present invention, in a case of using the receiving circuit, due to an effect that a great current is accumulated in the amplifying loop when receiving the magnetic field, the main loop can receive a receiving current that is greater than that in a case of using no amplifying loop.

As a result of the above, the present invention contributes to the area expansion of the radio system using a magnetic field without significantly increasing power consumption.

MODE FOR CARRYING OUT THE INVENTION

Figure 1:
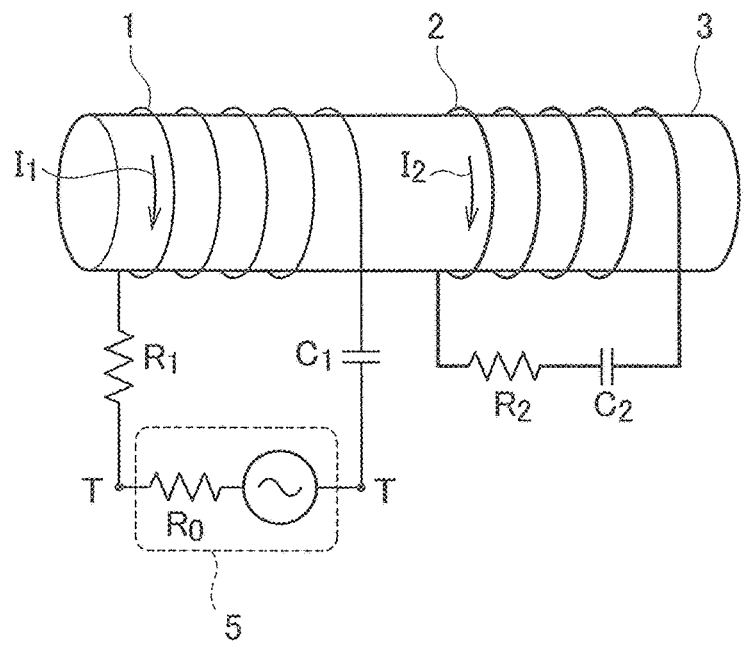
FIG. 1 is a diagram illustrating an example of a loop antenna according to a first embodiment.

Embodiments of the present invention are described below referring to the drawings.

First Embodiment

FIG. 1 is a diagram illustrating an example of a loop antenna according to a first embodiment.

The loop antenna is a resonant loop antenna including a main loop 1 and an amplifying loop 2.

The main loop 1 is wound on a bar-shaped rod 3 formed of a magnetic body or an insulation body and is an open loop having terminals T and T that couple a signal source 5 or a (not illustrated) receiving circuit to the main loop 1. The number of turns is 1 or more, for example, 5. FIG. 1 is a diagram in which the signal source 5 is coupled as an example. A resistor R1 and a capacitor C1 are coupled to the main loop 1 in series.

The amplifying loop 2 is wound on a part of the rod 3 that is different from the part on which the main loop 1 is wound. The main loop 1 and the amplifying loop 2 are spaced from each other. The amplifying loop 2 is a closed loop including no terminals. The number of turns is 1 or more, for example, 5. The number of turns may be the same as or different from the number of turns of the main loop 1. A resistor R2 and a capacitor C2 are coupled to the main loop 2 in series.

Once the main loop 1 is supplied with an alternating current I1 from the signal source 5, due to the mutual inductance between the main loop 1 and the amplifying loop 2, an alternating current I2 flows through the amplifying loop 2. In general, when a resistance value of the resistor R2 is smaller than a resistance value of the resistor R1, the alternating current I2 becomes greater than the alternating current I1. This allows area expansion of the magnetic field generated by the loop antenna.

The alternating current I2 depends on multiple elements such as a frequency, the resistor R1, the resistor R2, the capacitor C1, the capacitor C2, an internal resistor R0 of the signal source 5, and a shape of the loop. Thus, it is preferable to adjust respective values of the resistor R1, the resistor R2, the capacitor C1 and the capacitor C2 to maximize the alternating current I2.

Note that, although FIG. 1 illustrates the example of a case of coupling the signal source 5 to the loop antenna to use the loop antenna as a transmitting antenna, the receiving circuit may be coupled to the loop antenna instead of the signal source 5, and the loop antenna may be used as a receiving antenna.

In this case, due to the magnetic field received from outside, a great amount of the alternating current I2 is accumulated in the amplifying loop 2; however, due to the mutual inductance, also the alternating current I1 flowing through the main loop 1 becomes greater than a case there is no amplifying loop 2. The alternating current I1 can be maximized by setting respective values of the resistor R1, the resistor R2, the capacitor C1 and the capacitor C2 depending on a frequency and a shape of the loop. Thus, for also the other side, this allows the area expansion of the magnetic field.

Hence, according to the loop antenna of the first embodiment, the area expansion of the radio system using the magnetic field is achieved.

Note that, for example, if a desired current and area can be obtained, any one or more of the resistor R1, the resistor R2, the capacitor C1 and the capacitor C2 may not be used in some cases. It is the same with the later-described embodiment.

Second Embodiment

Figure 2:
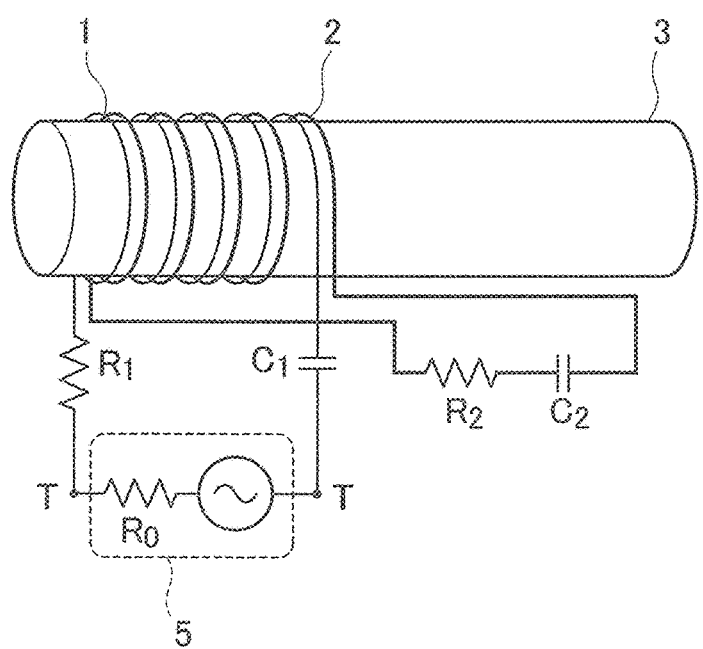
FIG. 2 is a diagram illustrating an example of a loop antenna according to a second embodiment.

FIG. 2 is a diagram illustrating an example of a loop antenna according to a second embodiment.

The main loop 1 and the amplifying loop 2 of the first embodiment are spaced from each other; however, in the second embodiment, the main loop 1 and the amplifying loop 2 are wound on the rod 3 while running side by side. Other configurations are the same with that in the first embodiment.

In the first embodiment, since there is the rod 3, the main loop 1 and the amplifying loop 2 generate relatively great magnetic connection. In the second embodiment, the main loop 1 and the amplifying loop 2 run side by side. As a result, the main loop 1 and the amplifying loop 2 are close to each other, thereby generating greater magnetic connection. This allows a greater current to be accumulated in the amplifying loop 2, and thus the area of the magnetic field can further expand.

In the present invention, the number of turns is arbitrary, and any number of turns is effective. The respective numbers of turns of the main loop 1 and the amplifying loop 2 may be different from each other; however, in a case where the number of turns is 2 or more, making the number of turns of the main loop 1 and the number of turns of the amplifying loop 2 equal allows the mutual inductance to be greater, and thus the amplification effect of the current can be enhanced. Hence, it is preferable to make the number of turns of the main loop 1 and the number of turns of the amplifying loop 2 equal.

Third Embodiment

A loop antenna of the third embodiment includes optimized capacitors coupled to the main loop 1 and the amplifying loop 2. Other configurations are the same as that of first and second embodiments.

For example, a frequency f of a signal generated from the signal source 5 is 10 MHz, the resistor R1 coupled to the main loop 1 is 25Ω, the resistor R2 coupled to the amplifying loop 2 is 1Ω, and the internal resistor R0 of the signal source 5 is 25Ω.

In addition, self-inductances L of the main loop 1 and the amplifying loop 2 are equally 1 μH.

The self-inductance of the loop depends on a geometric shape of the loop. Thus, making the geometric shapes of the main loop 1 and the amplifying loop 2 the same easily allows to make these self-inductances equal.

Figure 3:
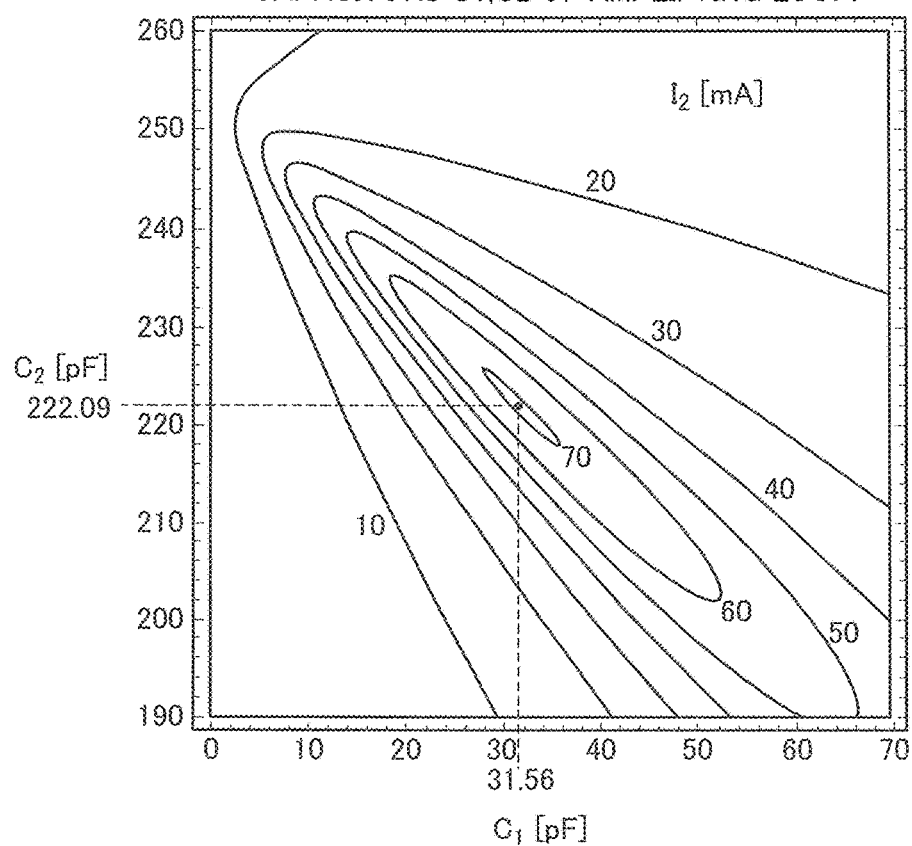
FIG. 3 is a diagram illustrating a relationship between a current I2 and capacitors C1 and C2 of an amplifying loop 2.

FIG. 3 is a diagram illustrating a relationship between the current I2 and the capacitors C1 and C2 of the amplifying loop 2.

Under the above condition, when simulating the current I2 with the capacitor C1 and the capacitor C2 as variables, the result illustrated in FIG. 3 is obtained. It can be seen that the maximum I2 is obtained when the capacitor C1 is almost 30 pF and the capacitor C2 is almost 220 pF.

Meanwhile, when the above parameters are substituted in the following equation 1, the capacitor C1=31.56 [pF], the capacitor C2=222.09 [pF] are obtained. Each frequency ω is calculated by using ω=2πf.

$$C_1 = \frac{1}{\omega^2 L}\left\{1 + \sqrt{\frac{R_0 + R_1}{R_2} - \left(\frac{R_0 + R_1}{\omega L}\right)^2}\right\}^{-1} \quad \text{[Equation 1]}$$

$$C_2 = \frac{1}{\omega^2 L}\left\{1 + \sqrt{\frac{R_2}{R_0 + R_1} - \left(\frac{R_2}{\omega L}\right)^2}\right\}^{-1}$$

Thus, coupling the capacitors C1 and C2 of the values calculated by using that equation 1 to the main loop 1 and the amplifying loop 2 allows the current I2 to be maximized, and the maximum amplification effect can be obtained.

When the receiving circuit is coupled to the main loop 1, the values of the capacitors C1 and C2 are calculated by using the following equation 2 in which the internal resistor R0 of the signal source 5 of the above equation 1 is changed to an internal resistor R4 of the receiving circuit.

$$C_1 = \frac{1}{\omega^2 L}\left\{1 + \sqrt{\frac{R_4 + R_1}{R_2} - \left(\frac{R_4 + R_1}{\omega L}\right)^2}\right\}^{-1} \quad \text{[Equation 2]}$$

$$C_2 = \frac{1}{\omega^2 L}\left\{1 + \sqrt{\frac{R_2}{R_4 + R_1} - \left(\frac{R_2}{\omega L}\right)^2}\right\}^{-1}$$

Figure 4:
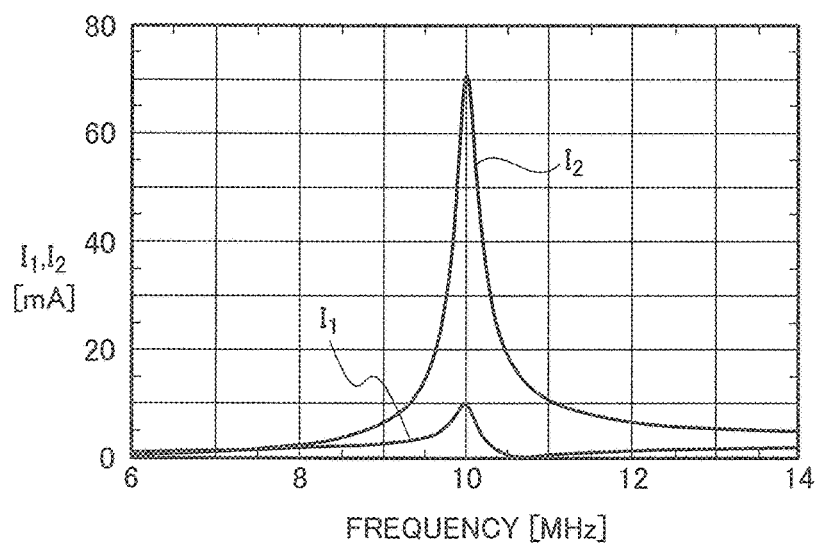
FIG. 4 is a diagram illustrating frequency dependence (calculated values) of I1 and I2 when C1=31.56 [pF], C2=222.09 [pF].

FIG. 4 is a diagram illustrating frequency dependence (calculated values) of the currents I1 and I2 when C1=31.56 [pF], C2=222.09 [pF].

As illustrated in FIG. 4, the current amplification effect becomes maximum at 10 MHz. That is, the current I1 is 10 mA while the current I2 is 70 mA or more. The current I2 is seven times or greater than the current I1. This allows the amplitude of the generatable magnetic field to be amplified seven times or greater. In other words, since the current flowing through the loop antenna can be amplified without increasing the current I1 supplied from the signal source 5, the great magnetic field can be generated with small power consumption. As a result, the area expansion of the radio system using the magnetic field is achieved.

EXPLANATION OF THE REFERENCE NUMERALS 1 main loop
2 amplifying loop
3 rod
5 signal source
C1, C2 capacitor
I1, I2 current
R0, R4 internal resistor
R1, R2 resistor
T terminal

The invention claimed is:

1. A loop antenna that is applied to a radio system using a magnetic field, comprising:
    a main loop that is an open loop to be coupled to a signal source or a receiving circuit; and
    an amplifying loop that is a closed loop having a same shape as the main loop, wherein
    the main loop and the amplifying loop are wound on a bar-shaped rod formed of a magnetic body or an insulation body,
    a resistor and a capacitor are coupled to each of the main loop and the amplifying loop in series, and
    a resistance coupled to the main loop is greater than a resistance coupled to the amplifying loop.

2. The loop antenna according to claim 1, wherein the number of turns of the main loop and the number of turns of the amplifying loop are equal.

3. The loop antenna according to claim 2, wherein the main loop and the amplifying loop are spaced from each other.

4. The loop antenna according to claim 2, wherein the main loop and the amplifying loop are wound while running side by side to each other.

5. The loop antenna according to claim 1, wherein the main loop and the amplifying loop are spaced from each other.

6. The loop antenna according to claim 1, wherein the main loop and the amplifying loop are wound while running side by side to each other.

* * * * *